(12) United States Patent
Keener

(10) Patent No.: US 7,354,009 B2
(45) Date of Patent: Apr. 8, 2008

(54) SEWAGE PUMP

(76) Inventor: Robert M. Keener, 1186 State Rte. 511 North, Ashland, OH (US) 44805

( * ) Notice: Subject to any disclaimer, the term of this patent is extended or adjusted under 35 U.S.C. 154(b) by 155 days.

(21) Appl. No.: 11/163,955

(22) Filed: Nov. 4, 2005

(65) Prior Publication Data

US 2007/0102547 A1 May 10, 2007

(51) Int. Cl.
*B02C 23/00* (2006.01)
*F04D 29/08* (2006.01)

(52) U.S. Cl. .............. 241/46.017; 241/46.06; 241/185.6; 415/111

(58) Field of Classification Search ............ 241/46.01, 241/46.017, 46.08, 46.06, 185.6; 415/111, 415/113, 229–231; 417/324.12, 423.3, 424.1
See application file for complete search history.

(56) References Cited

U.S. PATENT DOCUMENTS 6,086,339 A * 7/2000 Jeffrey ..................... 417/415
6,468,028 B1 * 10/2002 Rockwood ................. 415/58.4
6,659,720 B2 * 12/2003 Rockwood ................. 415/231
6,783,322 B2 * 8/2004 Ray et al. .................. 415/112
2002/0182055 A1 * 12/2002 Nagle ........................ 415/111

\* cited by examiner

*Primary Examiner*—Faye Francis
(74) *Attorney, Agent, or Firm*—Alan Kamrath; Kamrath & Associates PA

(57) ABSTRACT

A sewage pump includes a motor, a main shaft, an upper impeller, a lower impeller, a grinding wheel, a top cap, an upper bearing base with an upper mounting plate, an upper bearing base, a tube body with a wire inlet connector, a lower bearing base, a lower bearing with a lower mounting plate, a lower base and a vertical bypass. The main shaft has a quad-bearing structure to minimize deflection at high speed and high pressure and has rotary seals at each end to improve stability and sealing efficiency. Moreover, the wire inlet connector is filled with epoxy filling material to protect the wire, and the sewage pump further has moisture-sensors to timely stop the motor when sealing efficiency is failing.

5 Claims, 4 Drawing Sheets

US 7,354,009 B2

SEWAGE PUMP

BACKGROUND OF THE INVENTION

1. Field of the Invention

The present invention relates to a sewage pump, and more particularly to a sewage pump that comprises quad-bearing structures for supporting, multiple gaskets for sealing, epoxy filling material to protect wires, and a moisture-sensor to protect a motor so that the sewage pump is kept stable, durable and efficient at high speed operation.

2. Description of Related Art

A conventional sewage pump comprises single-bearing structure at a shaft end and is sealed with a single gasket so that the shaft has poor supporting strength and the sealing efficiency of the conventional sewage pump is insufficient. Moreover, wires and a motor in the sewage pump are not completely protected.

With reference to FIG. 1, the conventional sewage pump as shown in a cross-sectional side view comprises a motor 1, a main shaft 2, an upper impeller 3, a lower impeller 4, a grinder wheel 5, a top cap 6, an upper bearing base 7, a tube body 8, a wire inlet 9, a lower bearing base 10, a lower base 11 and a vertical bypass 12. In the conventional sewage pump, the motor 1 is the power source to drive the main shaft 2. The main shaft 2 penetrates the motor 1 and has an upper end engaging the upper impeller 3 and a lower end engaging the lower impeller 4 and the grinder wheel 5. The top cap 6 mounts on the zenith of the conventional sewage pump and has an upper inlet 61, an upper impeller chamber 62, an upper outlet 63 and a screw 64 combining the top cap 6 with the upper bearing base 7. The upper bearing base 7 has a rotary seal 71, a bearing 72 and a screw 73 combining the upper bearing base 7 with the tube body 8. The tube body 8 is the middle section of the conventional sewage pump and combines the lower bearing base 10 by a screw 81. The wire inlet 9 is defined on the tube body 8 to allow a wire penetrating therethrough. The lower bearing base 10 has a rotary seal 101 and a bearing 102 and is combined with the lower base 11 by a screw 103. The lower base 11 has a lower inlet 111, a lower impeller chamber 112 and a lower outlet 113 communicated with the vertical bypass 12. The vertical bypass 12 is a tube connecting the lower base 11 and the top cap 6 to communicate with the lower outlet 113 on the lower base 11 and the upper inlet 61 on the top cap 6 respectively at two ends.

With reference to FIG. 2 showing a perspective view of the conventional sewage pump, the top cap 6, the upper bearing base 7, the tube body 8, the lower bearing base 10 and the lower base 11 are arranged from top to bottom to achieve the conventional sewage pump. Combinations between the top cap 6 and the upper bearing base 7, the upper bearing base 7 and the tube body 8, the tube body 8 and the lower bearing base 10, and the lower bearing base 10 and the lower base 11 are achieved by screws. The wire inlet 9 is for entrance of the wire to provide power from outside. The vertical bypass 12 is connected between the lower inlet 111 on the lower base 11 and the upper outlet 63 on the top cap 6 so that sewage can be conducted into the sewage pump via the lower inlet 111, pumped through the vertical bypass 12 and then discharged out of the sewage pump via the upper outlet 63.

According to the above description, the main shaft 2 is simply supported by the bearing 72 on the upper bearing base 7 and the bearing 102 on the lower bearing base 10 respectively at each end so that the supporting strength is insufficient and the motor 1 can not efficiently drive the main shaft 2 and actuate the sewage-treating elements such as the upper impeller 3, the lower impeller 4 and the grinding wheel 5. Therefore, the treating efficiency of the conventional sewage pump is low. Moreover, the wire inlet 9 does not have any protection and the wire is easily damaged so that a broken circuit or a short circuit happens frequently. Additionally, because the main shaft 2 only has two rotary seals 71, 101 attached respectively at the two ends, sealing efficiency is poor and sewage probably permeates into the motor 1 or other driving elements. Without having any monitoring device such as moisture-sensors to signal water leakage and to timely stop the sewage pump, the motor 1 will malfunction.

SUMMARY OF THE INVENTION

According to above description, a modified sewage pump in the present invention is provided to overcome the drawbacks of the conventional sewage pump.

A main objective of the present invention is to provide a sewage pump that has quad-bearing structures on a main shaft to make the sewage pump excellent in supporting strength and durable at high speed operation.

Another main objective of the present invention is to provide a sewage pump that uses epoxy material to stuff a wire inlet connector on the sewage pump to further protect the wire and to prevent inadvertent damage caused by pulling or dragging.

Still another main objective of the present invention is to provide a sewage pump that has an internal moisture-sensor to monitor water leakage of the sewage pump and to timely stop the motor when the water leakage occurs.

To overcome the foregoing main objectives of the sewage pump in the present invention, the sewage pump comprises:

a motor providing the power and driving the sewage pump;

a main shaft penetrating the motor and having a top end combined with an upper impeller and a bottom end combined with a lower impeller and a grinding wheel;

a top cap serving as a zenith of the sewage pump and having an upper inlet, an upper impeller chamber and an upper outlet;

an upper bearing with an upper mounting plate that combines with the top cap;

an upper bearing base attached under the upper mounting plate on the upper bearing to provide an upper seal chamber therebetween;

a tube body hermetically engaged under the upper bearing base, having a side face and a protrusion tube extending from the side face, and combining with a wire inlet connector;

a lower bearing base hermetically engaged under the tube body;

a lower bearing with a lower mounting plate attached to the lower bearing base to provide an upper seal chamber therebetween;

a lower base attached under the lower mounting plate on the lower bearing and having a lower inlet, a lower impeller chamber and a lower outlet; and a vertical bypass communicated between the lower outlet on the lower base and the upper inlet on the top cap;

wherein, improvements of the sewage pump comprise:

the upper bearing with the upper mounting plate, the upper bearing base, the lower bearing base and the lower bearing with the lower mounting plate individually have a bearing portion to perform as a quad-bearing Structure on the main shaft to make the sewage pump stable and durable at high speed operation;

the upper bearing with the upper mounting plate, the upper bearing base, the lower bearing base and the lower bearing with the lower mounting plate individually have a rotary seal to make a hermetical seal on the sewage pump.

Further benefits and advantages of the present invention will become apparent after a careful reading of the detailed description with appropriate reference to the accompanying drawings.

DETAILED DESCRIPTION OF THE PREFERRED EMBODIMENT

A sewage pump in accordance with the present invention comprises a motor, a main shaft, an upper impeller, a lower impeller, a grinding wheel, a top cap, an upper bearing base with an upper mounting plate, an upper bearing base, a tube body with a wire inlet connector, a lower bearing base, a lower bearing with a lower mounting plate, a lower base and a vertical bypass. Improvement of the sewage pump is that the main shaft has a quad-bearing structure and multiple rotary seals at ends to improve stability and sealing efficiency of the sewage pump. Moreover, the wire inlet connector is filled with epoxy material to protect the wire and the bearing bases have moisture-sensors to timely stop the motor when the rotary seals are failing and water is in seal chambers. Therefore, the sewage pump has excellent efficiency, stability and durability.

Figure 1:
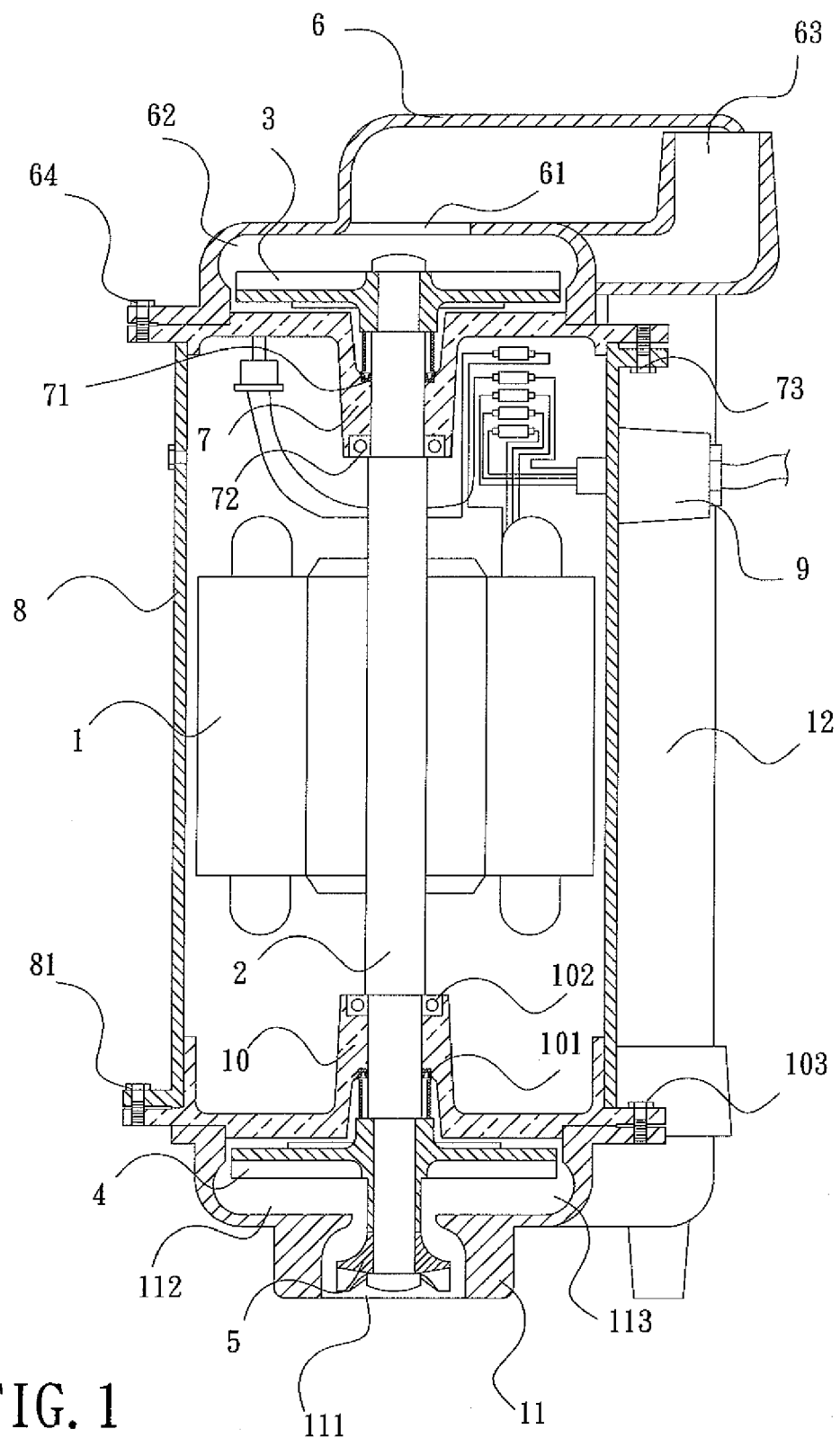
FIG. 1 is a cross-sectional side view of a conventional sewage pump in accordance with the prior art.
Figure 2:
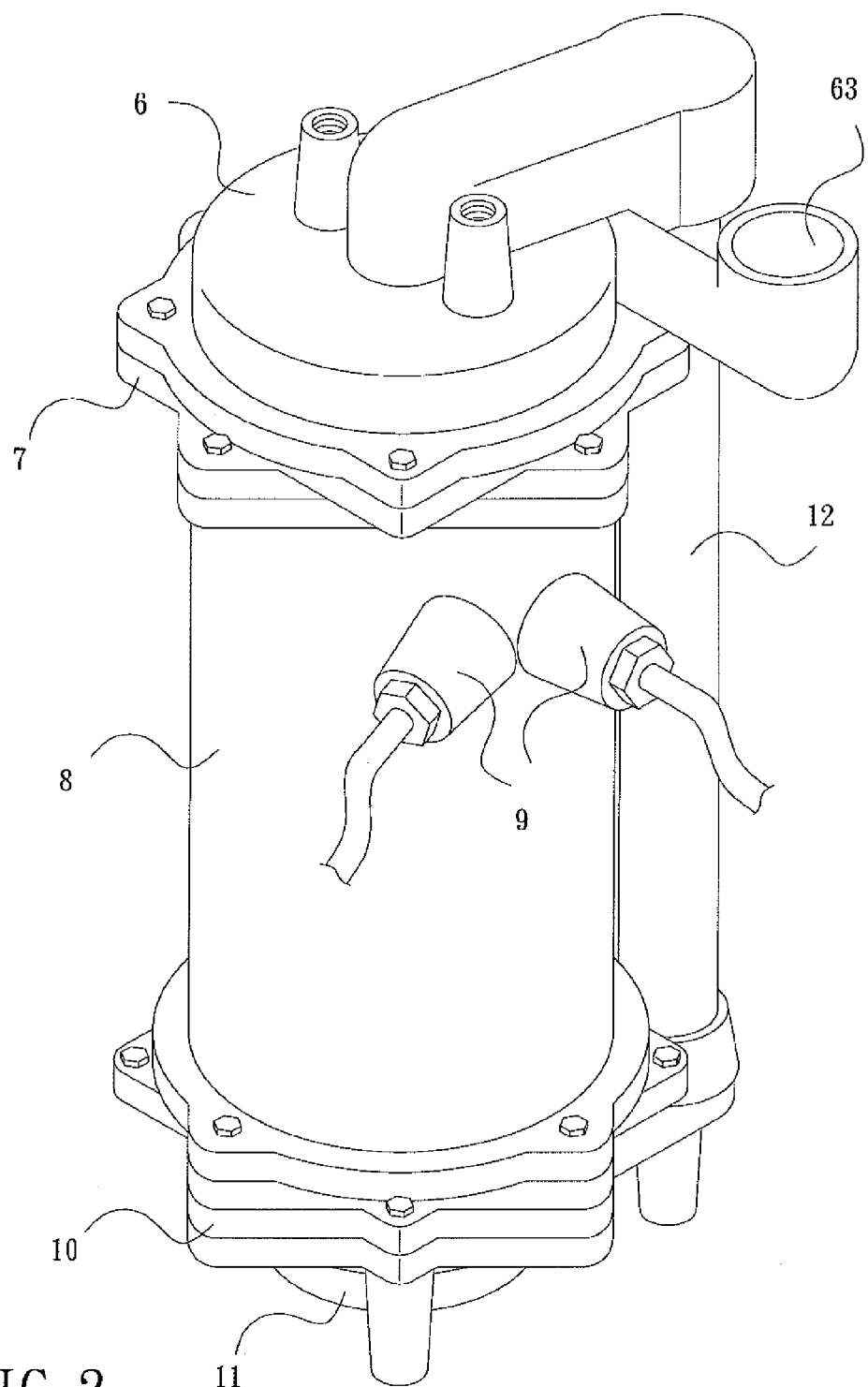
FIG. 2 is a perspective view of the conventional sewage pump in FIG. 1.
Figure 3:
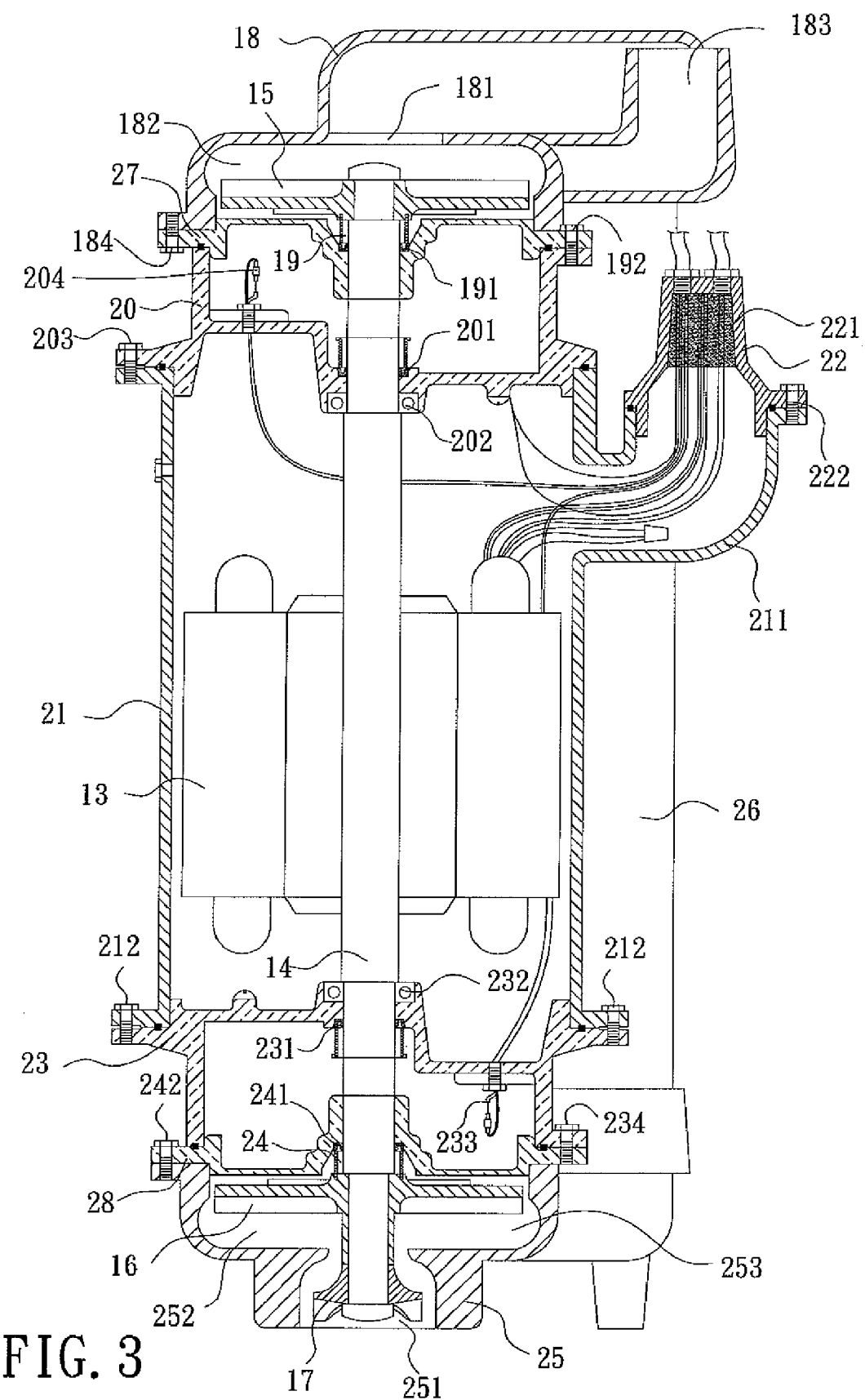
FIG. 3 is a cross-sectional side view of a sewage pump in accordance with the present invention.

With reference to FIG. 3, the sewage pump of the present invention comprises a motor 13, a main shaft 14, an upper impeller 15, a lower impeller 16, a grinding wheel 17, a top cap 18, an upper bearing 19 with an upper mounting plate 27, an upper bearing base 20, a tube body 21, a wire inlet connector 22, a lower bearing base 23, a lower bearing 24 with a lower mounting plate 28, a lower base 25 and a vertical bypass 26. In the present sewage pump, the motor 13 is the power source to drive the main shaft 14. The main shaft 14 axially penetrates the motor 13 and has an upper end engaging the upper impeller 15 and a lower end engaging the lower impeller 16 and the grinding wheel 17, wherein the upper impeller 15, the lower impeller 16 and the grinding wheel 17 are grinding elements. The top cap 18 mounts on a zenith of the sewage pump and has an upper inlet 181, an upper impeller chamber 182, an upper outlet 183 and a screw 184, wherein the top cap 18 attaches to the upper bearing base 19 with the upper mounting plate 27 by the screw 184 and the upper impeller chamber 182 accommodates the upper impeller 15. The upper bearing 19 with the upper mounting plate 27 is one-pieced and has a rotary seal 191 and a screw 192 that combines the upper bearing 19 with the upper bearing base 20 and then constructs an upper seal chamber (not numbered). A moisture-sensor 204 attached on the upper bearing base 20 inside the seal chamber to signal if sealing efficiency of the upper seal chamber is failing. The upper bearing base 20 has a gasket 201, a bearing 202 and a screw 203 that combines the upper bearing base 20 with the tube body 21. The tube body 21 is a middle section of the sewage pump and combines the lower bearing base 23 by a screw 212. The tube body 21 further has a protrusion tube 211 formed on a side face and combines with the wire inlet connector 22 by a screw 222 at the protrusion tube 211. The wire inlet connector 22 serves as entrance of wire and contains epoxy filling material inside. The lower bearing base 23 has a rotary seal 231, a bearing 232 and a moisture-sensor 233 and is combined with the lower bearing 24 by a screw 234 at the lower mounting plate 28. The lower bearing 24 with the lower mounting plate 28 is one-pieced bearing and has a rotary seal 241 inside and combines with the lower base 25 by a screw 242 to provide a lower seal chamber (not numbered) that accommodates the moisture-sensor 233. The lower base 25 is a bottom of the sewage pump and has a lower inlet 251, a lower impeller chamber 252 and a lower outlet 253 communicated with the vertical bypass 26. The vertical bypass 26 is a tube connecting the lower base 25 and the top cap 18 to communicate with the lower outlet 253 on the lower base 25 and the upper inlet 181 on the top cap 18 respectively at two ends.

By having the above elements, sewage is conducted into the sewage pump via the lower inlet 251 on the lower base 25, ground by the grinding wheel 17 and the lower impeller 16 in the lower impeller chamber 252 and then conducted to the vertical bypass 26 via the lower outlet 253. Then, the sewage is conducted to the top cap 18 via the upper inlet 181 and into the upper impeller chamber 182 to further increase pressure and be discharged out of the sewage pump via the upper outlet 183.

The upper bearing 19 with the upper mounting plate 27, the upper bearing base 20, the lower bearing base 23 and the lower bearing 24 with the lower mounting plate 28 each have a bearing structure and a rotary seal to increase supporting strength to the main shaft 14 and sealing efficiency. Therefore, the motor 13 drives the main shaft 14 with the upper impeller 15, the lower impeller and the grinding wheel 17 at high speed to minimize shaft deflection and to minimize the sewage in size to meet the discharge standard.

By packing the epoxy filling material 221 into the wire inlet connector 22, protection of the wire is enhanced.

By having moisture-sensors 204, 233 in the upper and lower seal chamber of the sewage pump, the moisture-sensors 204, 233 signal water leakage of the sewage pump and then stops the motor 13 when the water is in the upper and lower seal chambers and the seal efficiency is failing.

Figure 4:
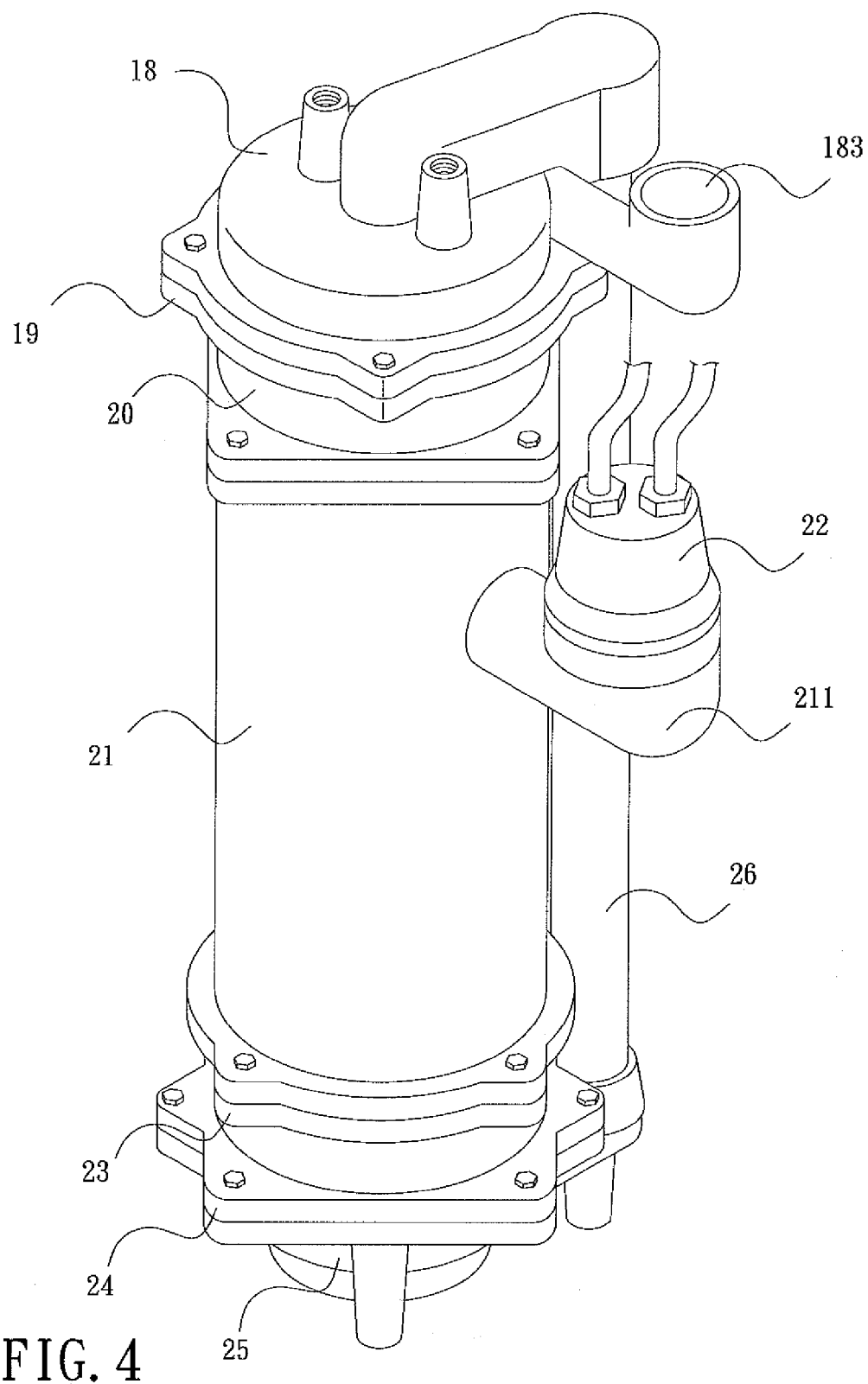
FIG. 4 is a perspective view of the sewage pump in FIG. 3.

With reference to FIG. 4 showing a perspective view of the sewage pump of the present invention, the top cap 18, the upper bearing 19 with the upper mounting plate 27, the upper bearing base 20, the tube body 21, the lower bearing base 23, the lower bearing 24 with the lower mounting plate 28 and the lower base 25 are arranged from top to bottom to achieve the present sewage pump. Connections of the top cap 18 and the upper bearing 19 with the upper mounting plate 27, the upper bearing 19 with upper mounting plate 27 and the upper bearing base 20, the upper bearing base 20 and the tube body 21, the tube body 21 and the lower bearing base 23, and the lower bearing base 23 and the lower bearing 24 with the lower mounting plate 28, and the lowering bearing 24 with the lower mounting plate 28 and the lower base 25 are all achieved by screws. The wire inlet connector 22 is for entrance of the wire to provide power from outside. The vertical bypass 26 connected between the lower inlet 251 on the lower base 25 and the upper outlet 183 on the top cap 18 so that sewage can be conducted into the sewage pump via the lower inlet 251, pumped through the vertical bypass 26 and then discharged out of the sewage pump via the upper outlet 183.

According to above description, improvement of the sewage pump in the present invention is to enhance the supporting stability at high speed operation by having dual-bearing structures at two ends of the main shaft 14. Moreover, the rotary seals 191, 241 and epoxy filling material packed inside the wire inlet connector 22 isolate the sewage from the motor 13 to protect the motor 13. The moisture-sensor 233 also ensures the operation of the motor 13 safe in the sewage pump.

Although this invention has been described in its preferred form with a certain degree of particularity, it is understood that the present invention of the preferred form has been made only by way of example and that numerous changes in the details of construction and the combination and arrangement of parts any be resorted to without departing from the spirit and scope of the invention.

What is claimed is:

1. A sewage pump comprising:
   a motor providing power;
   a main shaft penetrating the motor and having a top end combined with an upper impeller and a bottom end combined with a lower impeller and a grinding wheel;
   a top cap forming a zenith and having an upper inlet and an upper outlet;
   an upper bearing with an upper mounting plate that combines with the top cap and peripherally contacts the main shaft, with the upper mounting plate and the top cap forming an upper impeller chamber surrounding the top end and the upper impeller;
   an upper bearing base peripherally contacting the main shaft and attached under the upper mounting plate on the upper bearing, with the upper bearing, the upper bearing base, and the upper mounting plate providing an upper seal chamber in fluid isolation and sealed against pressure from the upper impeller chamber;
   a tube body hermetically engaged under the upper bearing base, having a side face and a protrusion tube extending from the side face, surrounding the motor and combining with a wire inlet connector;
   a lower bearing base peripherally contacting the main shaft and hermetically engaged under the tube body;
   a lower bearing peripherally contacting the main shaft and having a lower mounting plate attached to the lower bearing base, with the lower bearing, the lower bearing base, and the lower mounting plate providing a lower seal chamber, with the motor intermediate the lower seal chamber and the upper seal chamber axially along the main shaft, and with the motor in isolation from the upper seal chamber and the lower seal chamber;
   a lower base attached under the lower mounting plate on the lower bearing and having a lower inlet and a lower outlet, with the lower mounting plate and the lower base forming a lower impeller chamber surrounding the bottom end and the lower impeller, with the lower seal chamber in fluid isolation and sealed against pressure from the lower impeller chamber; and
   a vertical bypass communicated between the lower outlet on the lower base and the upper inlet on the top cap;
   wherein:
   the upper bearing and the upper mounting plate form a first bearing portion, the upper bearing base forms a second bearing portion axially spaced along the main shaft from the first bearing portion and on an opposite side of the upper seal chamber, the lower bearing base forms a third bearing portion, and the lower bearing and the lower mounting plate form a fourth bearing portion axially spaced along the main shaft from the third bearing portion and on an opposed side of the lower seal chamber, with the bearing portions providing a quad-bearing structure supporting the main shaft to make the sewage pump stable and durable at high speed operation; and
   the upper bearing and the upper mounting plate form a first rotary seal sealing the main shaft against pressure from the upper impeller chamber, the upper bearing base forms a second rotary seal axially spaced from the first rotary seal along the main shaft and on the opposite side of the upper seal chamber and sealing the upper chamber from the motor, the lower bearing base forms a third rotary seal sealing the lower seal chamber from the motor, and the lower bearing and the lower mounting plate form a fourth rotary seal axially spaced from the third rotary seal along the main shaft and on the opposed side of the lower seal chamber sealing the main shaft against pressure from the lower impeller chamber to make the sewage pump hermetical.

2. The sewage pump as claimed in claim 1, wherein the wire inlet connector is filled with epoxy filling material.

3. The sewage pump as claimed in claim 1, wherein the lower bearing base further comprises a moisture-sensor that electrically connects to the motor and operationally stops the motor when water is in the lower seal chamber and sealing efficiency of the lower seal chamber is failing.

4. The sewage pump as claimed in claim 3, wherein the upper bearing base further comprises a moisture-sensor that electrically connects to the motor and operationally stops the motor when water is in the upper seal chamber and the sealing efficiency of the upper seal chamber is failing.

5. The sewage pump as claimed in claim 1, wherein a combination of the top cap and the upper bearing and the upper mounting plate, the upper bearing and the upper mounting plate and the upper beating base, the upper bearing base and the tube body, the tube body and the lower bearing base, and the lower bearing base and the lower bearing and the lower mounting plate, and the lowering bearing and the lower mounting plate and the lower base is achieved by screws.

* * * * *